United States Patent Office 2,897,128
Patented July 28, 1959

2,897,128

STEROID COMPOUNDS AND THEIR PREPARATION

Gerald D. Laubach, Jackson Heights, N.Y., assignor to Chas. Pfizer & Co., Inc., New York, N.Y., a corporation of Delaware No Drawing. Original application March 17, 1954, Serial No. 416,936, now Patent No. 2,877,221, dated March 10, 1959. Divided and this application May 10, 1957, Serial No. 658,234

4 Claims. (Cl. 204—158)

This invention relates to the preparation of certain novel steroid intermediates useful in the artificial synthesis of therapeutic agents naturally derived from the adrenal cortex and like animal glands and tissues.

The present application is a division of copending application Serial Number 416,936, filed on March 17, 1954, now U.S. Patent 2,877,221.

Several of the steroid-type constituents and derivatives of the adrenal cortex have been shown to be of considerable importance in the control of physiological functions and in the therapy of certain diseases. It is highly important that synthesis of such compounds from cheap, readily available materials be developed, since the supply of natural precursors, e.g. extracts of animal glands, is definitely limited. The most difficult problem in such a synthesis is to introduce oxygen at the eleventh carbon position of the usual cyclic steroid nucleus. It is generally recognized that the presence of oxygen at this exact position is essential for the high biological activity of such naturally derived compounds as cortisone and compound F. A number of different methods have been proposed for this oxygen introduction. These have been briefly reviewed by Kendall in the Annals of the New York Academy of Science, vol. 50, p. 541–542 (1949). Many involve a number of steps and the overall yields are relatively low. Other methods have been proposed that require the use of corrosive or highly toxic chemicals, and in many cases purification of the products may be difficult. Furthermore, the best of these methods are not readily applicable to those steroids which are most widely available, such as the vegetable steroids.

A particular object of this invention is to rearrange the internal molecular structure of certain poly-unsaturated cyclic steroids, which are easily and cheaply obtained from vegetable sources, and to effect the ready and convenient introduction of oxygen at the eleventh carbon atom of the steroid nucleus.

This and other objects are realized by the present invention which broadly comprises photoperoxidizing a cyclic steroid compound containing conjugated double bonds at the 9(11), 8(14) positions. The new process is particularly successful, for instance, with 6, 9(11), 8(14)-triene steroids, i.e. those containing the radical

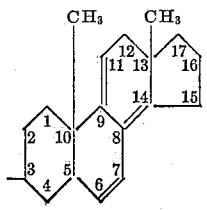

such as isodehydroergosterol

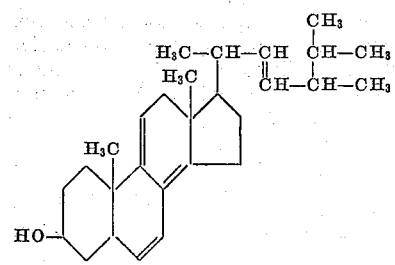

and its esters and ethers. Compounds of this type are described in copending application, Serial No. 222,946, filed April 25, 1951, by Laubach et al. and now abandoned, and in a continuation-in-part thereof, Serial No. 416,935, filed March 17, 1954, now U.S. Patent 2,838,527. They are generally prepared by isomerization of 5, 7, 9(11)-triene steroids.

Photoperoxidation of the 9(11), 8(14)-double bonded steroids yields novel products wherein a peroxide bridge extends between the $C_{11}$ and $C_{14}$ positions. Such products thus contain the radical

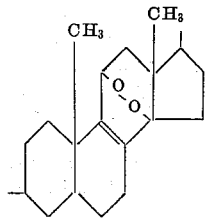

Similarly, photoperoxidation of the 6, 9(11), 8(14)-triene steroids results in new compositions containing the radical

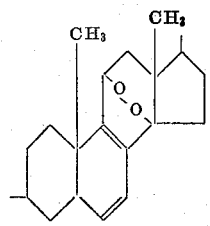

e.g. peroxides of isodehydroergosterol and its esters and ethers. In short, using the well-known ergosteryl acetate as an example, one may dehydrogenate to obtain dehydroergosteryl acetate, isomerize this to yield isodehydroergosteryl acetate, and finally photoperoxidize the isomer to recover isodehydroergosteryl acetate peroxide, or ergosta-6, 8(14), 9(11), 22-tetraen-3β-yl acetate peroxide. This compound may also be called $\Delta^{6,8,22}$-ergostatrien-3β-ol acetate 11,14-peroxide. It has the following formula:

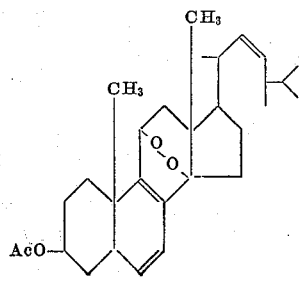

The physical properties of this unusual new compound are as follows:

M.P. 164.6–166.4° C.;
$[\alpha]_D$ —19° (CHCl$_3$);
$\lambda$ max. 272 m$\mu$ (log $\epsilon$=3.61) (ether).

Analysis.—Calcd. for C$_{30}$H$_{44}$O$_4$: C, 76.88; H, 9.46. Found: C, 77.03; H, 9.50.

These constants are slightly different from those given in the original application.

As another example of this photoperoxidation reaction, one may start with $\Delta^{6,8(14),9(11)}$-allopregnatrien-3$\beta$-ol-20-one acetate and convert it to $\Delta^{6,8}$-allopregnadien-3$\beta$-ol-20-one acetate 11,14-peroxide. The equation for this reaction is as follows:

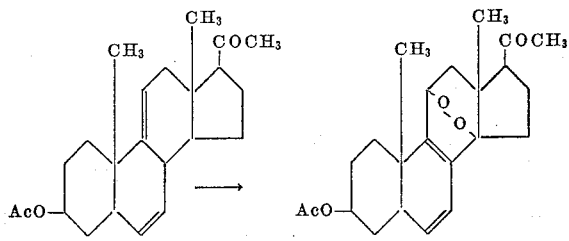

This novel product has the following physical constants:

M.P. 147.2–148.6° C.;
$\epsilon$ 272=3960;
$[\alpha]_D$ +72.6° (CHCl$_3$).

The peroxide compounds thus obtained may be converted directly to the corresponding 11-keto steroid compounds by the relatively simple procedure described in copending application Serial No. 368,199, filed on July 15, 1953, by Gerald D. Laubach et al. (now U.S. Patent 2,773,885). This procedure comprises contacting the peroxide with alkali. The result is illustrated by the following equation:

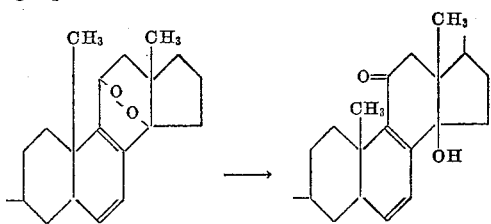

This same application also describes a process for removal of the 14-OH group by acid dehydration, as follows:

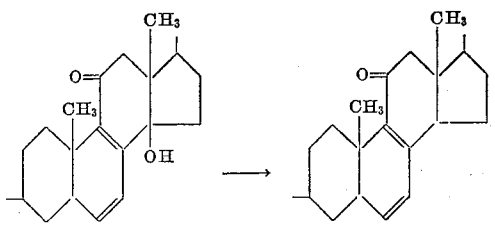

Compounds of the type obtained by this reaction may then be subjected to selective hydrogenation according to the process described in U.S. Patent No. 2,740,797. This process involves contacting the steroid with hydrogen in the presence of W-7 Raney nickel and an alkaline material. By this method both the 6 and 14 double bonds may be saturated, while neither the double bond at the 8 position, nor double bonds which may be present in a side chain such as that of the ergosterol derivatives, are changed. The following equation illustrates this:

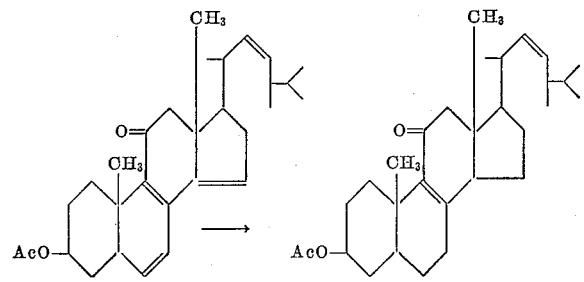

This last compound shown, $\Delta^{8,22}$-ergostadien-3$\beta$-ol-11-one acetate, is a well-known intermediate for the preparation of cortisone. Many of the other products of this present invention are also extremely valuable for this purpose, especially those which already contain at the 17 position a side chain similar to that of cortisone. Thus, by a relatively simple method one can effectively obtain therapeutically valuable cortisone and like intermediates. The new substances contain oxygen at the C$_{11}$ position so crucial for high biological activity.

The preferred method of photoperoxidation to obtain this addition of oxygen at C–11 of the steroid nucleus is by dissolving the chosen steroid in an organic solvent system and contacting the resulting solution with oxygen. The oxygen may be used in the pure state or as it is found in air, or it may be diluted with inert gases. Essentially any known organic solvent which will dissolve the steroid and yet not itself react with the constituents of the reaction system may be utilized. Aromatic hydrocarbons like benzene, toluene, xylene, and so forth; aliphatic or cycloaliphatic hydrocarbons like hexane, low or moderate boiling petroleum fractions, and cyclohexane; or lower alcohols such as ethanol are commercially most desirable, although the lower alcohols have the disadvantage of generally dissolving only a rather limited amount of the steroid.

The oxygen treatment of this steroid solution is effected in the presence of an oxidation activator and of light. As the illumination, which is essential for catalyzing the oxidation, sunlight or any artificial source of light which gives approximately the same wave lengths, e.g., incandescent light or a carbon arc, may be used. The dye known as eosin or dyes of related structure are quite suitable to activate the oxygen-addition. Such "activators" and their function are well known and various alternative materials will readily occur to those skilled in this art. A very small amount of such a compound, say in the order of 0.001% (based on the weight of steroid), is used in commercial operation, but a considerably lower proportion will serve. This substance may easily be removed from the peroxide product.

In conducting the reaction, the temperature rises more or less rapidly depending upon the rate of aeration, the design of the equipment and so forth. It is best not to let the temperature rise above about 60° C. The reaction proceeds fairly rapidly, generally being completed in less than about ten hours and sometimes in less than one hour. The rate, of course, depends to a certain extent upon the type of apparatus, the reactants, the temperature and other factors. Although the steroid molecule may continue to adsorb oxygen after the C–11 addition is completed, the rate is definitely slower; hence by following the course of oxygen adsorption, the reaction may be stopped at the proper point. In a convenient form of apparatus for this reaction, a flask sealed from the atmosphere is attached to a manometer and to a reservoir of air or oxygen so that, while the mixture is agitated, the absorption of the oxygen by the reaction mixture may be observed.

After completion of the reaction, the product may be recovered by any desired means. The solvent is usually removed by distillation and the dry residue washed free of eosin or other activator with a solvent like methanol. The product is then recrystalized, such as from a chloroform-methanol mixture according to conventional practice. A yield of at least about 50 percent of quite pure crystalline product is thus obtained. If material of extremely high purity is desired, it may be recovered, for instance, by chromatography of the crystalline material in petroleum ether on alumina. After development of the column with petroleum ether, gradually increasing amounts of benzene are added to portions of the ether and the product is finally removed from the column by means of benzene. Crystals of the desired peroxide of high purity are then obtained by concentrating the benzene eluate.

Isolated double bonds not within the cyclic structure, side chains and other substituents of the particular steroid generally have no deleterious effect on oxygen-addition. Thus, the side chains attached to the isodehydroergosterol-type steroid nucleus at the 17-position or the 3-position may be considerably varied without interfering with the reaction. Rather than the unsaturated aliphatic side chain at C-17, a compound may be utilized having a carboxyl, an acetyl, a $COCH_2OH$ group or esters and ethers thereof, a spiroketal group or simply an oxygen (i.e. the 17-keto compound) or the like attached at that point. The group at the 3 position may be OH, or an ether or ester group, instead of simply the acetyl group previously mentioned. In a like manner, when the group at the 17 position is a side chain having OH, e.g. $COCH_2OH$, either the free OH or an ester or ether thereof may be employed. On either a side chain OH or the OH at the 3 position, useful ester groups include, for example, formate, propionate and benzoate, and useful ether groups include methyl, ethyl and benzyl. Isodehydroergosterol may readily be prepared from its esters by hydrolysis and then photoperoxidized. However, the isodehydroergosteryl esters are preferred by reason of availability, cost, ease of commercial operation and value of the isomeric products.

The following examples are given by way of illustration and are not intended as a limitation of this invention. Indeed, as many apparently widely different embodiments of the present invention may be made without departing from the spirit and scope hereof; it is to be understood that the invention is limited as defined in the appended claims only.

*Example I*

A solution of 1.8 grams (0.0041 mole) of ergosta-6, 8(14), 9(11), 22-tetraen-3β-yl acetate ($[\alpha]_D^{25}=-74.5°$) in 1.5 liters of ethanol containing 0.010 gram of eosin was irradiated with a 200 watt incandescent bulb for eight hours. The solution was maintained at 30–35° C. by cooling. A vigorous stream of oxygen was passed through the solution during the course of the irradiation. The reaction mixture was then concentrated under vacuum to a mass of colorless platelets, from which most of the eosin dye was removed by trituration with cold methanol. The peroxide product was obtained as a slightly pink solid, melting point 152–154° C. The yield was 0.890 gram (46%). A portion of this material (0.435 g.) was chromatographed over alumina (activated at 500–600° C.) in a column with a diameter of 18 mm. After elution of the more soluble contaminants with a 1:8 benzene-petroleum ether mixture, the desired product was recovered by elution with 1:4 then 1:2 benzene-petroleum ether washes and finally with benzene alone. The combined fractions contained the peroxide product in the amount of 0.247 gram. Two standard recrystallizations from methanol yielded analytically pure isodehydroergosteryl acetate peroxide as colorless platelets, melting point 164.6–166.4° C.

*Example II*

A solution of 0.874 gram (0.002 mole) of ergosta-6, 8(14), 9(11), 22-tetraen-3β-yl acetate ($[\alpha]_D^{25}=-78°$) in 10 ml. of anhydrous benzene was mixed with 5 ml. of ethanol containing 0.050 gram eosin. The mixture was stirred in a closed system under a positive oxygen pressure of 1 atmosphere. The reaction vessel was illuminated with a 500 watt, 120 volt floodlamp and cooled in a bath maintained at 7.5–9.5° C. After 60 minutes one mole of oxygen had been adsorbed and the rate of oxygen uptake, as observed on the manometer of the apparatus, decreased sharply. After removal of some precipitated eosin, the reaction mixture was concentrated under vacuum to a partially crystalline mass, which on trituration with 20 ml. of cold 80% methanol yielded the desired peroxide as colorless platelets. This product weighed 0.820 gram, indicating a yield of 87.5%. It was chromatographed over 24 grams of alumina (activated at 500–600° C.) in a 25 mm. column and impurities were removed as before with petroleum ether, 8:1 petroleum ether-benzene mixture, and benzene alone. The resulting purified isodehydroergosteryl acetate peroxide weighed 0.380 gram, being recovered in a yield of 41.5%.

The equation for the reaction in this example and in Example I, is as follows:

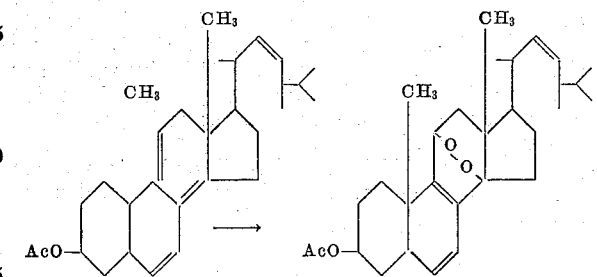

*Example III*

The procedure of Example II was repeated, using various ester and ether groups in the 3 position instead of the acetate group present in Example II. Useful groups include, for example, formate, propionate and benzoate among the esters, and methyl, ethyl and benzyl among the ethers. The reaction was also carried out with the 3-OH group unprotected. None of these changes in the group at the 3 position had any effect on the overall reaction, and peroxide formation took place in exactly the same manner as before.

*Example IV*

The procedure of Example II was repeated, using $\Delta^{6,8(14),9(11)}$-allopregnatrien-3β-ol-20-one-acetate as the starting steroid. Peroxide formation took place as previously described, and the product was $\Delta^{6,8}$-allopregnadien-3β-ol-20-one-acetate 11,14-peroxide. The equation for this reaction is as follows:

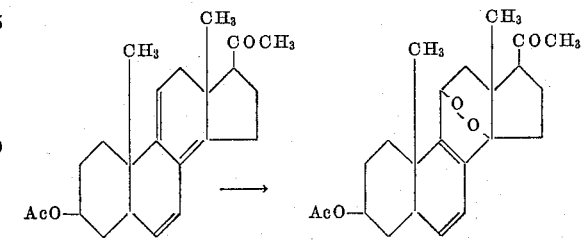

*Example V*

The procedure of Example IV was repeated, using various ester and ether groups in the 3 position instead of the acetate group present in Example IV. Useful groups include, for example, formate, propionate and benzoate among the esters, and methyl, ethyl and benzyl among the ethers. The reaction was also carried out with the 3-OH group unprotected. None of these changes in the group at the 3 position had any effect on the overall reaction, and peroxide formation took place in exactly the same manner as before.

Example VI

The procedure of Example II was repeated using $\Delta^{6,8(14),9(11)}$-allopregnatrien-3β,21-diol-20-one diacetate as the starting steroid. Peroxide formation took place as previously described, and the product was $\Delta^{6,8}$-allopregnadien-3β,21-diol-20-one diacetate 11,14 peroxide. The equation for this reaction is as follows:

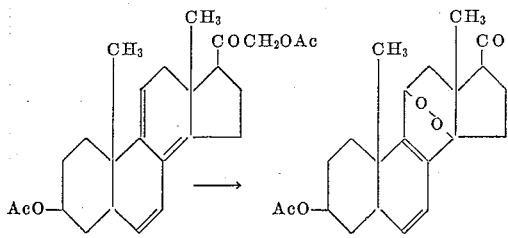

Example VII

The procedure of Example VI was repeated, using various ester and ether groups in the 3 and 21 positions instead of the acetate groups present in Example VI. Useful groups include, for example, formate, propionate and benzoate among the esters, and methyl, ethyl and benzyl among the ethers. The reaction was also carried out with the 3 and 21-OH groups unprotected. None of these changes in the groups at the 3 and 21 positions had any effect on the overall reaction, and peroxide formation took place in exactly the same manner as before.

What is claimed is:

1. A process which comprises dissolving in a stable organic solvent system a steroid compound having the formula

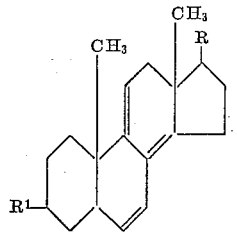

where R is selected from the class consisting of

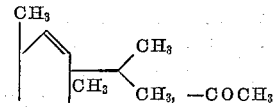

—COCH$_2$OH and an ester thereof wherein the ester group is derived from hydrocarbon carboxylic acids having from 1 to 7 carbon atoms, and R$^1$ is selected from the class consisting of OH, and an ester group derived from hydrocarbon carboxylic acids having from 1 to 7 carbon atoms, contacting the resulting solution with oxygen in the presence of an oxidation activator and of light, and recovering the resulting peroxide of said compound.

2. A process according to claim 1 wherein R is

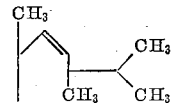

and R$^1$ is the acetate group.

3. A process according to claim 1 wherein R is —COCH$_3$, and R$^1$ is the acetate group.

4. A process according to claim 1 wherein the temperature of the mass is maintained at no more than about 60° C. during such contact.

References Cited in the file of this patent

UNITED STATES PATENTS 2,732,337     Togel _____ Jan. 24, 1956

OTHER REFERENCES

Journal of American Chemical Society, vol. 75 (March 20, 1953), pp. 1514 and 1515.

Journal of Organic Chemistry, vol. 4 (1939), pp. 41 and 42.